(12) United States Patent
Saito et al.

(10) Patent No.: US 6,716,918 B2
(45) Date of Patent: Apr. 6, 2004

(54) METHACRYLATE-BASED POLYMER AND PROCESS FOR PRODUCING THE SAME

(75) Inventors: Takahiro Saito, Yokkaichi (JP); Osamu Nishizawa, Yokkaichi (JP); Takeshi Fukuda, Uji (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/023,220

(22) Filed: Dec. 20, 2001

(65) Prior Publication Data

US 2002/0156196 A1 Oct. 24, 2002

(30) Foreign Application Priority Data

Dec. 22, 2000 (JP) .................................. 2000-391307
Jan. 24, 2001 (JP) .................................. 2001-015231
Jan. 24, 2001 (JP) .................................. 2001-015232

(51) Int. Cl.$^7$ .............................. C08F 2/38; C08F 4/06; C08L 33/18
(52) U.S. Cl. .................. 525/94; 525/245; 525/329.5; 526/319; 526/329.7; 526/171; 526/318.44; 526/144
(58) Field of Search ................. 525/94, 245, 329.5; 526/319, 144, 171, 318.44, 329.7

(56) References Cited

U.S. PATENT DOCUMENTS 5,763,548 A 6/1998 Matyjaszewski et al.
5,807,937 A 9/1998 Matyjaszewski et al.
6,407,187 B1 * 6/2002 Matyjaszewsli et al. ...... 526/89

OTHER PUBLICATIONS

Queffelec et al: "Optimization of Atom Transfer Radical Polymerization Using Cu(I)/Tris(2–(dimethylamio)ethyl)amine as a Catalyst," pp. 8629–8639, 2000.
Tong et al: "Synthesis, Morphology, and Mechanical Properties of Poly(methyl methacrylate)–b–poly(n–butyl acrylate)–b–poly(methyl methacrylate) Triblocks, Ligated Anionic Polymerization vs Atom Transfer Radical Polymerization," pp. 470–479; *American Chemical Society, Macromolecules* 2000.

* cited by examiner

Primary Examiner—James J. Seidleck
Assistant Examiner—Olga Asinovsky
(74) Attorney, Agent, or Firm—Nixon & Vanderhye P.C.

(57) ABSTRACT

In accordance with the present invention, there is provided a process for producing a polymer by a living radical polymerization method which is also applicable to the polymerization of a methacrylate monomer, and a methacrylate-based polymer having a narrow molecular weight distribution which is produced by the above process. Specifically, the present invention relates to a process for producing a methacrylate-based polymer by a atom transfer radical polymerization method in which a polymerizable monomer containing at least one methacrylate monomer is polymerized in the presence of a redox catalyst comprising a metal complex containing at least one transition metal as a central metal selected from the group consisting of elements of Groups 7 to 11 of the Periodic Table, using an organohalogen compound or a halogenated sulfonyl compound as a polymerization initiator.

10 Claims, No Drawings

METHACRYLATE-BASED POLYMER AND PROCESS FOR PRODUCING THE SAME

BACKGROUND OF THE INVENTION

The present invention relates to a process for producing a methacrylate-based polymer by a living radical polymerization method, and a methacrylate-based polymer produced by the process.

Conventionally, the following three types of living radical polymerization methods have been studied.

(1) First, a propagating radical is produced from a radical polymerization initiator or a covalent bond chemical species. Then, a pseudo-termination reaction in which the propagating radical and a complementary radical are reacted with each other while incorporating monomers thereinto for producing the covalent bond chemical species, and a reaction in which the complementary radical is dissociated from the covalent bond chemical species to form the propagating radical again, are reversibly caused, so that the polymerization proceeds.

(2) First, a low-valence metal chemical species oxidatively abstracts an atom from a covalent bond chemical species, thereby producing a propagating radical and a high-valence metal chemical species. Then, a pseudo-termination reaction in which the propagating radical and the high-valence metal chemical species are reacted with each other while incorporating monomers thereinto for producing a low-valence metal chemical species, and a reaction in which a high-valence metal chemical species is dissociated from the low-valence metal chemical species to form the propagating radical again, are reversibly caused, so that the polymerization proceeds.

(3) First, a propagating radical is produced from a radical polymerization initiator. Then, a pseudo-termination reaction in which the propagating radical and a chain transfer agent are reacted with each other while incorporating monomers thereinto for producing a chain transfer radical, a reaction in which the chain transfer radical and the chain transfer chemical species are reacted with each other to transfer the radical, and a pseudo-termination reaction in which the chain transfer radical and the monomer are reacted with each other to produce the chain transfer radical again, are simultaneously caused, so that the polymerization proceeds.

Among these methods, the method (2) which is classified into atom transfer radical polymerization method, is expressed by the following reaction formula:

First, the low-valence metal complex (1) radically abstracts the halogen atom X from the halogen-containing polymerization initiator P-X, thereby producing the high-valence metal complex (2) and a carbon-centered radical P. (the reaction rate of the reaction between the low-valence metal complex (1) and the halogen-containing polymerization initiator P-X is expressed by $K_{act}$). As shown in the above reaction formula, the carbon-centered radical P. is then reacted with a monomer to form a similar intermediate radical species P. (the reaction rate of the reaction between the carbon-centered radical P. and the monomer is expressed by $K_{propagation}$). The reaction between the high-valence metal complex (2) and the radical P produces the product P-X and simultaneously regenerate the low-valence metal complex (1) (the reaction rate of the reaction between the high-valence metal complex (2) and the radical P. is expressed by $K_{deact}$). Then, the low-valence metal complex (1) and the product P-X are further reacted with each other, so that the polymerization reaction further proceeds. In order to control the above polymerization reaction, it is most important to reduce the concentration of the propagating radical species P. to a low level.

Specifically, the following atom transfer radical polymerization methods have been reported:

(1) Polymerization of styrene conducted in the presence of CuCl and a bipyridyl complex using α-chloroethylbenzene as a polymerization initiator (J. Wang and K. Matyjaszewski, J. Am. Che. Soc., 117, 5614 (1995)).

(2) Polymerization of methyl methacrylate conducted in the presence of $RuCl_2(PPh_3)_3$ and an organoaluminum compound using $CCl_4$ as a polymerization initiator (M. Kato, M. Kamigaito, M. Sawamoto and T. Higashimura, "Macromolecules", 28, 1821 (1995)).

Thereafter, with further development of ligands, metal species, polymerization initiators, etc., the atom transfer radical polymerization method has been widely applied to various monomers including acrylate monomers.

However, the equilibrium condition shown in the above reaction formula cannot be sometimes established. The non-equilibrium reaction is frequently observed when applied especially to polymerization of methacrylate. The reason therefore is considered to be that the concentration of the propagating radical becomes considerably high because of any electronic or steric effect by substituents of the ester group.

In U.S. Pat. No. 5,807,937, it is described that the radical concentration can be reduced by adding the high-valence metal complex (2) (e.g., $CuCl_2$) in an amount of preferably 0.2 to 10 mol % to the low-valence metal complex (1) (e.g.,

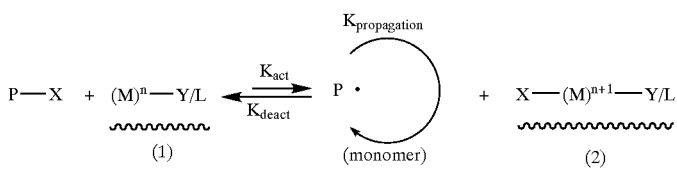

In the above reaction formula, P represents a polymer chain; (M) represents a transition metal; X represents a halogen atom; Y and L are ligands capable of coordinating to (M); n and n+1 are valences of (M); and (1) and (2) represent a low-valence metal complex and a high-valence metal complex, respectively, constituting a redox conjugated system.

CuCl). However, in some cases, this method is still insufficient to maintain the equilibrium condition as shown in the above reaction formula. Even if the high-valence metal complex (2) is added in a higher amount, since the complex (2) has a poor solubility, the polymerization reaction itself still proceeds considerably slowly because of the too low concentration of the high-valence metal complex (2) contributing to the above equilibrium reaction.

Also, when it is intended to apply the atom transfer radical polymerization method to the production of block copolymers, the block polymerization sometimes fails to smoothly proceed depending upon kinds of monomers used. It is considered that the poor block polymerization is caused by the difference between easiness of abstracting the halogen atom from the end of the polymerization initiator and easiness of abstracting halogen bonded to the end of the successively added monomer, i.e., $K_{act}$ in the above reaction formula. In particular, in the case where the first block chain is constituted from acrylate-based monomers, since the rate for abstracting halogen from the end of the acrylate is too slow, it becomes difficult to conduct the subsequent formation (i.e., block polymerization) of the second block chain composed of methacrylate-based monomers.

SUMMARY OF THE INVENTION

An object of the present invention is to provide a living radical polymerization method applicable to the polymerization of a methacrylate monomer, and a process for producing a methacrylate-based polymer by the living radical polymerization method. Also, the present invention provides a process for producing a copolymer comprising a first block chain composed of an acrylate-based monomer and a second block chain composed of a methacrylate-based monomer by an atom transfer polymerization method, and the like.

To accomplish the aims, in a first aspect of the present invention, there is provided a process for producing a methacrylate-based polymer, comprising:

polymerizing (d1) a radical-polymerizable monomer containing at least one methacrylate-based monomer in the presence of (c1) a redox catalyst comprising a metal complex containing at least one transition metal as a central metal selected from the group consisting of elements of Groups 7 to 11 of the Periodic Table, said redox catalyst containing a low-valence metal $(M)^n$ wherein n represents an atomic valence of the metal, and a high-valence metal $(M)^{n+1}$ both constituting the redox catalyst system, and having a molar ratio of $(M)^n$ to $(M)^{n+1}$ of 90/10 to 0.1/99.9, upon initiation of the polymerization, using (a1) at least one polymerization solvent selected from the group consisting of water, ethers, amides, nitriles and alcohols, and (b1) a polymerization initiator selected from the group consisting of organohalogen compounds, halogenated sulfonyl compounds and halogen-containing macroinitiators.

In the first aspect of the present invention, the polymerization solvent used therein is preferably at least one solvent selected from the group consisting of water, ethers, amides and alcohols. The low-valence metal $(M)^n$ is preferably at least one metal selected from the group consisting of $Cu^{1+}$, $Ru^{2+}$, $Fe^{2+}$ and $Ni^{2+}$. In addition, the polymerization initiator is preferably an organohalogen compound or a halogenated sulfonyl compound.

In the preferred form of the first aspect of the present invention, there is provided a methacrylate-based polymer produced by the above production process. The methacrylate-based polymer preferably has a molecular weight distribution of Mw to Mn of not more than 1.8.

In a second aspect of the present invention, there is provided a process for producing a block copolymer, comprising at least the following step (i) and step (ii):

(i) forming a first block chain, said step (i) comprising polymerizing (d2) an acrylate-based monomer in the presence of (c2) a redox catalyst comprising a metal complex containing at least one transition metal (M) as a central metal selected from the group consisting of elements of Groups 7 to 11 of the Periodic Table, and a ligand containing at least a halogen atom selected from the group consisting of bromine and iodine, using (b2) a polymerization initiator selected from the group consisting of bromine- or iodine-containing organic halides and bromine- or iodine-containing halogenated sulfonyl compounds; and (ii) forming a second block chain, said step (ii) comprising polymerizing (d3) a methacrylate-based monomer in the presence of (c3) a redox catalyst comprising a metal complex containing at least one transition metal (M) as a central metal selected from the group consisting of elements of Groups 7 to 11 of the Periodic Table, and a ligand containing at least a halogen atom selected from the group consisting of chlorine and fluorine, said redox catalyst containing a low-valence metal $(M)^n$ wherein n represents an atomic valence of the metal, and a high-valence metal $(M)^{n+1}$ both constituting the redox catalyst system, and having a molar ratio of $(M)^n$ to $(M)^{n+1}$ of 90/10 to 0.1/99.9, upon initiation of the polymerization for forming the second block chain.

In the second aspect of the present invention, the low-valence metal $(M)^n$ is preferably at least one metal selected from the group consisting of $Cu^{1+}$, $Ru^{2+}$, $Fe^{2+}$ and $Ni^{2+}$.

Also, in the preferred form of the second aspect of the present invention, there is provided a block copolymer comprising an acrylate-based block chain and a methacrylate-based block chain, wherein at least one propagated end of the methacrylate-based block chain is a halogen end. In this preferred form, the amount of the halogen end is 0.7 to 1 per one propagated end, and the halogen end is a chlorine end or a fluorine end.

Further, in the preferred form, there is provided a block copolymer produced by the process according to the second aspect of the present invention.

In a third aspect of the present invention, there is provided a process for producing a block copolymer, comprising:

first forming a first block chain by polymerizing (d4-1) an acrylate-based monomer in the presence of (c4) a redox catalyst comprising a metal complex containing at least one transition metal as a central metal selected from the group consisting of elements of Groups 7 to 11 of the Periodic Table, using (b4) a polymerization initiator selected from the group consisting of organohalogen compounds and halogenated sulfonyl compounds; and then forming a second block chain by polymerizing the first block chain with an acrylate-based monomer and/or a styrene-based monomer, and a methacrylate-based monomer.

In the third aspect of the present invention, the central metal (M) is preferably at least one metal selected from the group consisting of Cu, Ru, Fe and Ni, and the ratio of the acrylate-based monomer and/or the styrene-based monomer to the methacrylate-based monomer is preferably 1 to 50% by weight.

DETAILED DESCRIPTION OF THE INVENTION

The present invention will be described in detail below. The living radical polymerization method used in the present invention is an atom transfer radical polymerization method, and conceptionally expressed by the above reaction formula.

The process for producing a methacrylate-based polymer according to the first aspect of the present invention comprises polymerizing (d1) a radical-polymerizable monomer containing at least one methacrylate-based monomer in the presence of (c1) a redox catalyst comprising a metal complex containing at least one transition metal (M) as a central metal selected from the group consisting of elements of Groups 7 to 11 of the Periodic Table, said redox catalyst containing a low-valence metal $(M)^n$ wherein n represents an atomic valence of the metal, and a high-valence metal $(M)^{n+1}$ both constituting the redox catalyst system, and having a molar ratio of $(M)^n$ to $(M)^{n+1}$ of 90/10 to 0.1/99.9, upon initiation of the polymerization, using (a1) at least one polymerization solvent selected from the group consisting of water, ethers, amides, nitrites and alcohols, and (b1) a polymerization initiator selected from the group consisting of organohalogen compounds, halogenated sulfonyl compounds and halogen-containing macroinitiators.

The process according to the first aspect of the present invention is explained in detail below.

(a1) Polymerization Solvent:

In the above process of the present invention, as the polymerization solvent (a1), there is used at least one solvent selected from the group consisting of water, ethers, amides, nitrites and alcohols. Examples of the ethers may include diethyl ether, tetrahydrofuran, diphenyl ether, anisole, dimethoxybenzene or the like. Examples of the amides may include N,N-dimethylformamide (DMF), N,N-dimethylacetamide or the like. Examples of the nitrites may include acetonitrile, propionitrile, benzonitrile or the like. Examples of the alcohols may include methanol, ethanol, propanol, isopropanol, n-butyl alcohol, t-butyl alcohol, isoamyl alcohol or the like. Among these solvents, the use of at least one solvent selected from the group consisting of water, ethers, amides and alcohols is more preferred. Of these solvents, anisole and DMF are especially preferred.

The above polymerization solvent may be used in the form of a mixture with the other solvent, for example, an aromatic hydrocarbon such as benzene and toluene, a halogenated hydrocarbon such as chlorobenzene, methylene chloride, chloroform and chlorobenzene, or the like. However, in such a case, it is required that the molar amount of the polymerization solvent is not less than that of the polymerization initiator.

The amount of the polymerization solvent used is not particularly restricted, and is usually 0.1 to 5,000 parts by weight, preferably 1 to 2,000 parts by weight, more preferably 10 to 1,000 parts by weight based on 100 parts by weight of the monomers charged. The range of amount of the polymerization solvent used may also be determined by appropriate combination of these lower and upper limits.

(b1) Polymerization Initiator:

In the process of the present invention, there is used a polymerization initiator selected from the group consisting of organohalogen compounds, halogenated sulfonyl compounds and halogen-containing macroinitiators. The organohalogen compounds and halogenated sulfonyl compounds used in the process of the present invention are not particularly restricted as long as these compounds contain at least one halogen atom acting as a polymerization initiation point (hereinafter sometimes referred to merely as "polymerization initiation end" or "initiation end"), and are usually such compounds containing one or two halogen atoms acting as the initiation point. Examples of the preferred polymerization initiators may include compounds represented by the following formulae (1) to (19) wherein $C_6H_5$ is phenyl; $C_6H_4$ is phenylene; R is hydrogen, $C_1$ to $C_{20}$ alkyl, aryl or aralkyl which may contain on the respective carbon atoms, a functional group such as alcoholic hydroxyl, amino, carboxyl and alkylthio, and when two or more R groups are present in one molecule, these groups may be the same or different; X is a halogen atom such as chlorine, bromine and iodine, and when two or more X groups are present in one molecule, these groups may be the same or different; and n is an integer of 0 to 20:

<Polymerization Initiators having One Initiation Point>

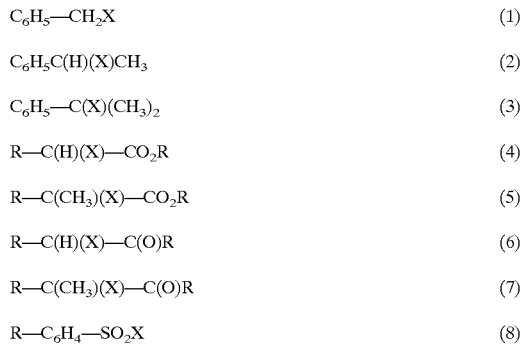

<Polymerization Initiators having Two Initiation Points>

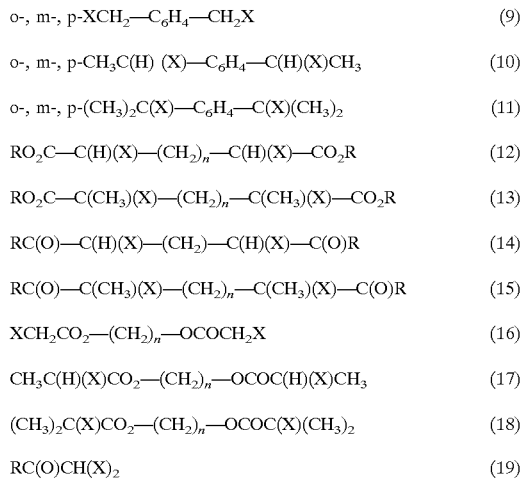

Specific examples of the polymerization initiators represented by the above formulae (1) to (19) may include the following compounds:

Polymerization initiators represented by the formula (1): phenylmethyl chloride, phenylmethyl bromide, phenylmethyl iodide or the like;

Polymerization initiators represented by the formula (2): 1-phenylethyl chloride, 1-phenylethyl bromide, 1-phenylethyl iodide or the like;

Polymerization initiators represented by the formula (3): 1-phenylisopropyl chloride, 1-phenylisopropyl bromide, 1-phenylisopropyl iodide or the like;

Polymerization initiators represented by the formula (4): 2-chloropropionic acid, 2-bromopropionic acid, 2-iodopropionic acid, 2-chlorobutanoic acid, 2-bromobutanoic acid, 2-iodobutanoic acid, methyl 2-chloropropionate, ethyl 2-chloropropionate, methyl 2-bromopropionate, ethyl 2-bromopropionate, methyl 2-iodopropionate or the like;

Polymerization initiators represented by the formula (5): 2-chloroisobutyric acid, 2-bromoisobutyric acid, 2-iodoisobutyric acid, methyl 2-chloroisobutyrate, ethyl 2-chloroisobutyrate, methyl 2-bromoisobutyrate, ethyl 2-bromoisobutyrate, methyl 2-iodoisobutyrate, ethyl 2-iodoisobutyrate or the like;

Polymerization initiators represented by the formula (6): α-chloroacetophenone, α-bromoacetophenone, α-chloroacetone, α-bromoacetone or the like;

Polymerization initiators represented by the formula (7): α-chloroisopropylphenyl ketone, α-bromoisopropylphenyl ketone or the like;

Polymerization initiators represented by the formula (8): p-toluenesulfonyl chloride, p-toluenesulfonyl bromide or the like;

Polymerization initiators represented by the formula (9): α,α'-dichloroxylene, α,α'-dibromoxylene, α,α'-diiodoxylene or the like;

Polymerization initiators represented by the formula (10): bis(1-chloroethyl)benzene, bis(1-bromoethyl)benzene the like;

Polymerization initiators represented by the formula (11): bis(1-chloro-1-methylethyl)benzene, bis(1-bromo-1-ethyl)benzene or the like;

Polymerization initiators represented by the formula (12): dimethyl 2,5-dichloroadipate, dimethyl 2,5-dibromoadipate, dimethyl 2,5-diiodoadipate, diethyl 2,5-dichloroadipate, diethyl 2,5-dibromoadipate, diethyl 2,5-diiodoadipate, dimethyl 2,6-dichloro-1,7-heptanedioate, dimethyl 2,6-dibromo-1,7-heptanedioate, dimethyl 2,6-diiodo-1,7-heptanedioate, diethyl 2,6-dichloro-1,7-heptanedioate, diethyl 2,6-dibromo-1,7-heptanedioate, diethyl 2,6-diiodo-1,7-heptanedioate or the like;

Polymerization initiators represented by the formula (13): dimethyl 2,6-dichloro-2,6-dimethyl-1,7-heptanedioate, dimethyl 2,6-dibromo-2,6-dimethyl-1,7-heptanedioate or the like;

Polymerization initiators represented by the formula (14): 3,5-dichloro-2,6-heptanedione, 3,5-dibromo-2,6-heptanedione or the like;

Polymerization initiators represented by the formula (15): 3,5-dichloro-3,5-dimethyl-2,6-heptanedione, 3,5-dibromo-3,5-dimethyl-2,6-heptanedione or the like;

Polymerization initiators represented by the formula (16): ethylene glycol bis(2-bromoacetic acid) ester or the like;

Polymerization initiators represented by the formula (17): ethylene glycol bis(2-bromopropionic acid) ester, ethylene glycol bis(2-chloropropionic acid) ester or the like;

Polymerization initiators represented by the formula (18): ethylene glycol bis(2-bromoisobutyric acid) ester, ethylene glycol bis(2-chloroisobutyric acid) ester or the like; and Polymerization initiators represented by the formula (19): α,α'-dichloroacetophenone, α,α'-dibromoacetophenone or the like.

The halogen-containing macroinitiator used in the process of the present invention is a polymer having at least one halogen end acting as a polymerization initiation point (polymerization initiation end).

The halogen-containing macroinitiator can be usually produced by the living radical polymerization method which is carried out in the presence of a redox catalyst by an atom transfer radical polymerization method or a reverse atom transfer radical polymerization method. In the case of the atom transfer radical polymerization method, a radical-polymerizable monomer is subjected to living radical polymerization in the presence of a halogen-containing radical polymerization initiator and a low-valence metal complex as a catalyst upon initiation of the polymerization. On the other hand, in the case of the reverse atom transfer radical polymerization method, a radical-polymerizable monomer is subjected to living radical polymerization in the presence of a conventional radical polymerization initiator and a halogen-containing high-valence metal complex as a catalyst upon initiation of the polymerization. In both polymerization methods, the polymerization initiator used therein is not particularly restricted, and any suitable compound may be used as long as at least one halogen atom acting as an initiation point is contained therein. Usually, the polymerization initiator is such a compound having one or two halogen atoms. Theoretically, the number of initiation points of the polymerization initiator used for the production of macroinitiator is identical to the number of initiation points per one molecule of the obtained macroinitiator. However, in some cases, the number of initiation points of the macroinitiator is slightly small than that of the polymerization initiator because of occurrence of side reactions such as recombination reaction, disproportionation reaction and halogen-elimination reaction. Therefore, the obtained macroinitiator is in the form of a mixture of macroinitiators which are different in molecular weight distribution and number of initiation points from each other.

The preferred method for producing the macroinitiator is a living radical polymerization method using an atom transfer radical polymerization method. The polymerization conditions of the living radical polymerization method are the same as those of the below-mentioned process of the present invention except that the polymerization initiator used therein is limited to specific ones. Therefore, detailed explanations thereof are omitted herein.

In the process for producing the halogen-containing macroinitiator, the radical polymerization may be carried out in the absence of a solvent or in the presence of various solvents. Examples of the optionally usable polymerization solvents may include water; ethers such as diethyl ether, tetrahydrofuran, diphenyl ether anisole and dimethoxybenzene; amides such as N,N-dimethylformamide and N,N-dimethylacetamide; nitrites such as acetonitrile, propionitrile and benzonitrile; ester compounds or carbonate compounds such as acetone, methyl ethyl ketone, methyl isobutyl ketone, ethyl acetate, butyl acetate, ethylene carbonate and propylene carbonate; alcohols such as methanol, ethanol, propanol, isopropanol, n-butyl alcohol, t-butyl alcohol and isoamyl alcohol; aromatic hydrocarbons such as benzene and toluene; halogenated hydrocarbons such as chlorobenzene, methylene chloride, chloroform and chlorobenzene; or the like.

The amount of the polymerization solvent used is not particularly restricted, and usually 0.1 to 5,000 parts by weight, preferably 1 to 2,000 parts by weight, more preferably 10 to 1,000 parts by weight based on 100 parts by weight of the monomers charged. The range of amount of the polymerization solvent used may also be determined by appropriate combination of these lower and upper limits.

The monomer used for the production of the halogen-containing macroinitiator is not particularly restricted, and any radical-polymerizable monomers may be used for this purpose. The monomers usable for the production of the halogen-containing macroinitiator may be the same as or different from those subsequently used in the polymerization process of the present invention in which the macroinitiator is used as a polymerization initiator. In the case where the monomer used for the production of macroinitiator is different form that used in the process of the present invention, if the macroinitiator containing one halogen atom acting as initiation point is used as a polymerization initiator, a di-block copolymer can be produced. Whereas, if the macroinitiator containing two halogen atoms acting as initiation points is used as a polymerization initiator, a tri-block copolymer can be produced. The production of the block copolymers is described in detail below as to the second aspect of the present invention.

As the polymerization initiator, there are preferably used organohalogen compounds or halogenated sulfonyl compounds. Specific examples of these compounds may include 1-phenylethyl chloride, 1-phenylethyl bromide, 2-chloropropionitrile, 2-chloropropionic acid or alkyl esters thereof, 2-bromopropionic acid or alkyl esters thereof, 2-chloroisobutyric acid or alkyl esters thereof, 2-bromoisobutyric acid or alkyl esters thereof, α,α'-dichloroxylene, α,α'-dibromoxylene, p-halomethylstyrene, dialkyl 2,5-dibromoadipate and dialkyl 2,6-dibromo-1,7-heptanedioate. Among these polymerization initiators, 1-phenylethyl chloride, 1-phenylethyl bromide, methyl 2-chloropropionate, ethyl 2-chloropropionate, methyl 2-bromopropionate, ethyl 2-bromopropionate, α,α'-dichloroxylene, α,α'-dibromoxylene, dimethyl 2,5-dibromoadipate and dimethyl 2,6-dibromo-1,7-heptanedioate are more preferred.

(c1) Redox Catalyst:

In the process of the present invention, there is used a redox catalyst comprising a metal complex containing at least one transition metal (M) as a central metal selected from the group consisting of elements of Groups 7 to 11 of the Periodic Table, and a ligand containing at least a halogen atom. The redox catalyst (redox conjugated complex) has two reversible forms, i.e., a low-valence metal complex having a low-valence metal $(M)^n$ as a central metal and a high-valence metal complex having a high-valence metal $(M)^{n+1}$ as a central metal wherein n represents an atomic valence, and is an integer of not less than 0, usually 0, 1, 2, 3, 4, 5 or 6.

Specifically, the low-valence metal $(M)^n$ is at least one metal selected from the group consisting of $Cu^{1+}$, $Ni^0$, $Ni^+$, $Ni^{2+}$, $Pd^0$, $Pd^+$, $Pt^0$, $Pt^+$, $Pt^{2+}$, $Rh^+$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$ and $Mn^{3+}$. Among these metals, $Cu^{1+}$, $Ru^{2+}$, $Fe^{2+}$ and $Ni^{2+}$ are preferred. Here, the high-valence metal $(M)^{n+1}$ means a metal having a valence higher by 1 than that of the low-valence metal $(M)^n$.

Examples of compounds used as the low- or high valence metals may include monovalent copper compounds, divalent nickel compounds, divalent iron compounds, divalent ruthenium compounds or the like. Specific examples of the monovalent copper compounds may include cuprous chloride, cuprous bromide, cuprous cyanide or the like. Specific examples of the divalent nickel compounds may include nickel dichloride, nickel dibromide, nickel diiodide or the like. Specific examples of the divalent iron compounds may include iron dichloride, iron dibromide, iron diiodide or the like. Specific examples of the divalent ruthenium compounds may include ruthenium dichloride, ruthenium dibromide, ruthenium diiodide or the like.

The amount of the low-valence metal $(M)^n$ used is not particularly restricted. The concentration of the low-valence metal $(M)^n$ in the reaction system is usually $10^{-4}$ to $10^{-1}$ mol/liter, preferably $10^{-3}$ to $10^{-1}$ mol/liter. Also, the amount of the low-valence metal $(M)^n$ used is usually 0.01 to 100 moles, preferably 0.1 to 50 moles, more preferably 0.1 to 10 moles based on one mole of a polymerization initiation end of the polymerization initiator. The range of concentration of the low-valence metal $(M)^n$ used may be determined by appropriate combination of these lower and upper limits.

The above metal complex contains an organic ligand. The organic ligand acts for solubilizing the complex into the polymerization solvent and enabling the reversible transformation between the redox conjugated complexes. As ligands coordinated to the metal, there may be exemplified nitrogen, oxygen, phosphorus, sulfur or the like. Of these ligands, nitrogen and phosphorus are preferred. Specific examples of the organic ligands may include 2,2'-bipyridyl and its derivatives thereof, 1,10-phenanthroline and its derivatives thereof, tetramethylethylenediamine, pentamethyldiethylenetriamine, tris(dimethylaminoethyl)amine, triphenylphosphine, tributylphosphine or the like.

The above transition metal (M) and the organic ligand may be separately added and then formed into the metal complex in the polymerization reaction system. Alternatively, the metal complex may be preliminarily synthesized and then added to the polymerization reaction system. Especially in the case of copper, the use of the former method is preferred, while in the case of ruthenium, iron and nickel, the use of the latter method is preferred.

Specific examples of the ruthenium, iron and nickel complexes preliminarily synthesized may include tris-triphenylphosphino-ruthenium dichloride ($RuCl_2(PPh_3)_3$), bis-triphenylphosphino-iron dichloride ($FeCl_2(PPh_3)_2$), bis-triphenylphosphino-nickel dichloride ($NiCl_2(PPh_3)_2$), bis-tributylphosphino-nickel dibromide ($NiBr_2(PBu_3)_2$) or the like.

The redox catalyst used in the present invention can be formed by adding the high-valence metal complex to the low-valence metal complex. In the process of the present invention, it is important that the molar ratio of the low-valence metal $(M)^n$ to the high-valence metal $(M)^{n+1}$ both constituting the redox catalyst system upon initiation of the polymerization, is in the range of 90/10 to 0.1/99.9.

That is, the present invention is characterized in that the molar ratio of the low-valence metal $(M)^n$ to the high-valence metal $(M)^{n+1}$ in the redox catalyst is defined to the above-specified range when using the above polymerization solvent. Under this condition, the polymerization of any monomer system including a methacrylate monomer can be controlled without considerable deterioration in polymerization rate while maintaining the redox equilibrium. Thus, in the process of the present invention, the polymerization can proceed in a living manner under the above-specified conditions, thereby facilitating the control of the polymerization and enabling the production of a polymer having a narrow molecular weight distribution. On the other hand, when the amount of the low-valence metal $(M)^n$ exceeds the above range, it may be difficult to control the polymerization. When the amount of the low-valence metal $(M)^n$ is less than the above range, the polymerization may not proceed at a sufficient rate. The molar ratio of the low-valence metal $(M)^n$ to the high-valence metal $(M)^{n+1}$ is preferably 60/40 to 1/99. The range of the molar ratio of the low-valence metal $(M)^n$ to the high-valence metal $(M)^{n+1}$ is may be determined by appropriate combination of these lower and upper limits.

(d1) Radical-polymerizable Monomer Containing at Least One Methacrylate-based Monomer:

In the process of the present invention, there is used a radical-polymerizable monomer containing at least one methacrylate-based monomer.

Examples of the methacrylate-based monomer may include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, cyclohexyl methacrylate, lauryl methacrylate, n-octyl methacrylate, 2-methoxyethyl methacrylate, butoxyethyl methacrylate, methoxy tetraethylene glycol methacrylate, 2-hydroxyethyl methacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethylene glycol methacrylate, polyethylene glycol methacrylate, 2-(dimethylamino)ethyl methacrylate or the like.

The monomers copolymerized with the methacrylate-based monomer are not particularly restricted as long as these monomers are ordinary radical-polymerizable monomers. As such radical-polymerizable monomers, there may be usually used acrylate-based monomers and styrene derivatives. Specific examples of the comonomers may include methyl acrylate, ethyl acrylate, propyl acrylate, n-butyl acrylate, t-butyl acrylate, hexyl acrylate, 2-ethylhexyl acrylate, nonyl acrylate, benzyl acrylate, cyclohexyl acrylate, lauryl acrylate, n-octyl acrylate, 2-methoxyethyl acrylate, butoxyethyl acrylate, methoxy tetraethylene glycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethylene glycol acrylate, polyethylene glycol acrylate, 2-(dimethylamino)ethyl acrylate, N,N-dimethyl acrylamide, N-methylol acrylamide, N-methylol methacrylate, N-vinyl pyrrolidone, styrene, o-methoxystyrene, m-methoxystyrene, p-methoxystyrene, o-t-butoxy styrene, m-t-butoxy styrene, p-t-butoxy styrene, o-chloromethyl styrene, m-chloromethyl styrene, p-chloromethyl styrene or the like. Two or more of these comonomers may be random-copolymerized or block-copolymerized with the methacrylate-based monomer. Further, during the polymerization of the methacrylate-based monomer, the comonomer may be gradually added and copolymerized therewith.

(e1) Other Polymerization Conditions

The living radical polymerization method used in the present invention may be performed at a temperature of usually −50 to 200° C., preferably 0 to 150° C., more preferably 20 to 130° C. The polymerization temperature range may be determined by appropriate combination of these lower and upper limits.

After completion of the polymerization, distillation-off of residual monomers and/or solvents, precipitation in appropriate solvent, filtration or centrifugal separation of precipitated polymers, and washing and drying of resultant polymers may be carried out by known methods. Also, if required, the polymerization reaction solution may be further diluted in a good solvent for the produced polymer such as tetrahydrofuran (THF) and toluene, and then passed through a column filled with alumina, silica or clay, or through a pad to remove the transition metal complex used as the catalyst from the polymerization solvent. In addition, there may be adopted a method of dispersing a metal adsorbent in the polymerization reaction solution to remove residual metal components therefrom.

If required, the metal components may remain in the obtained polymer. The obtained polymer may be then analyzed by size exclusion chromatography and NMR spectra measurement.

As solvent used for the precipitation, there may be used water; $C_5$ to $C_8$ alkanes such as pentane, hexane and heptane; $C_5$ to $C_8$ cycloalkanes such as cyclohexane; $C_1$ to $C_6$ alcohols such as methanol, ethanol and isopropyl alcohol; or the like. Among these solvents, water, hexane, methanol and mixtures thereof are preferred.

The polymer obtained by the process of the present invention has a number-average molecular weight (Mn) of usually 250 to 500,000, preferably 500 to 250,000. The range of the number-average molecular weight may be determined by appropriate combination of these lower and upper limits. The molecular weight distribution (weight-average molecular weight (Mw)/number-average molecular weight (Mn)) of the obtained polymer is usually not more than 1.8, preferably not more than 1.5.

Since the production process of the present invention is performed by a living radical polymerization method, the polymerization can be freely controlled, e.g., may be quasi terminated by bonding a halogen atom X to the polymerizable radical end, or may be initiated again by producing a polymerizable radical end from the halogen end. In addition, since the polymer obtained by the process of the present invention contains the halogen end capable of initiating a further polymerization, even after the first monomer is completely consumed for producing a first block chain, it is possible to form a second block chain grown from the end of the first block chain by adding a second monomer thereto. Further, when the same or different monomers are added, it is also possible to produce a multi-block copolymer.

Next, the process for producing a block copolymer according to the second aspect of the present invention is explained below.

The production process according to the second aspect of the present invention comprises at least the following step (i) and step (ii):

(i) forming a first block chain, said step (i) comprising polymerizing (d2) an acrylate-based monomer in the presence of (c2) a redox catalyst comprising a metal complex containing at least one transition metal (M) as a central metal selected from the group consisting of elements of Groups 7 to 11 of the Periodic Table, and a ligand containing at least a halogen atom selected from the group consisting of bromine and iodine, using (b2) a polymerization initiator selected from the group consisting of bromine- or iodine-containing organic halides and bromine- or iodine-containing halogenated sulfonyl compounds; and (ii) forming a second block chain, said step (ii) comprising polymerizing (d3) a methacrylate-based monomer in the presence of (c3) a redox catalyst comprising a metal complex containing at least one transition metal as a central metal selected from the group consisting of elements of Groups 7 to 11 of the Periodic Table, and a ligand containing at least a halogen atom selected from the group consisting of chlorine and fluorine, said redox catalyst containing a low-valence metal $(M)^n$ wherein n represents an atomic valence of the metal, and a high-valence metal $(M)^{n+1}$ both constituting the redox catalyst system, and having a molar ratio of $(M)^n$ to $(M)^{n+1}$ of 90/10 to 0.1/99.9, upon initiation of the polymerization for forming the second block chain.

The above steps (i) and (ii) are sequentially explained below.

(i) Step for Forming the First Block Chain:

(a2) Polymerization Solvent

In the step (i), the radical polymerization may be carried out in the absence of a solvent or in the presence of various solvents. Examples of the optionally usable polymerization solvents may include water; ethers such as diethyl ether, tetrahydrofuran, diphenyl ether, anisole and dimethoxybenzene; amides such as N,N-dimethylformamide and N,N-dimethylacetamide; nitriles such as acetonitrile, propionitrile and benzonitrile; ester compounds or carbonate compounds such as acetone, methyl ethyl ketone, methyl isobutyl ketone, ethyl acetate, butyl acetate, ethylene carbonate and propylene carbonate; alcohols such as methanol, ethanol, n-propyl alcohol, isopropyl alcohol, n-butyl alcohol, t-butyl alcohol and isoamyl alcohol; aromatic hydrocarbons such as benzene and toluene; halogenated hydrocarbons such as chlorobenzene, methylene chloride, chloroform and chlorobenzene; or the like.

The amount of the polymerization solvent used is not particularly restricted, and is usually 0.1 to 5,000 parts by weight, preferably 1 to 2,000 parts by weight, more preferably 10 to 1,000 parts by weight based on 100 parts by weight of the monomers charged. The range of amount of the polymerization solvent used may also be determined by appropriate combination of these lower and upper limits.

(b2) Polymerization Initiator

The polymerization initiator used in the step (i) is selected from bromine- or iodine-containing organohalogen compounds and bromine- or iodine-containing halogenated sulfonyl compounds. The bromine- or iodine-containing organohalogen compounds and bromine- or iodine-containing halogenated sulfonyl compounds contained in the polymerization initiators represented by the formulae (1) to (19) may also be used as the polymerization initiator in the step (i). The use of such a polymerization initiator enhances the polymerization initiation efficiency upon forming the second block chain.

(c2) Redox Catalyst

In the step (i), there is used a redox catalyst comprising a metal complex containing at least one transition metal (M) as a central metal selected from the group consisting of elements of Groups 7 to 11 of the Periodic Table, and a ligand containing at least a halogen atom selected from the group consisting of bromine and iodine.

As the redox catalyst, the low-valence metal complexes or the high-valence metal complexes containing bromine or iodine as the halogen atom x among those compounds exemplified in the above (c1) may be used in this step. When the halogen atom constituting these metal complexes is not bromine nor iodine, the $K_{act}$ in the above reaction formula is too small, so that it becomes difficult to produce the first block chain "..A..".

Upon initiation of polymerization of the step (i), the molar ratio of the low-valence metal complex to the high-valence metal complex preferably lies with the same range as in the above (c1) though not particularly limited thereto.

As the redox catalyst used in the step (i), the monovalent copper compounds are preferred, and copper bromide and copper iodide are more preferred.

The amount of the metal complex used and the organic ligand thereof are the same as those described in the above (c1).

(d2) Acrylate-Based Monomer

Examples of the acrylate-based monomer (A) used in the step (i) may include methyl acrylate, ethyl acrylate, propyl acrylate, n-butyl acrylate, t-butyl acrylate, hexyl acrylate, 2-ethylhexyl acrylate, nonyl acrylate, benzyl acrylate, cyclohexyl acrylate, lauryl acrylate, n-octyl acrylate, 2-methoxyethyl acrylate, butoxyethyl acrylate, methoxy tetraethylene glycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethylene glycol acrylate, polyethylene glycol acrylate, 2-(dimethylamino)ethyl acrylate, N,N-dimethyl acrylamide, N-methylol acrylamide, or the like. Two or more of these monomers may be random-copolymerized or block-copolymerized. Further, these monomer may be gradually added during the polymerization.

(e2) Other Polymerization Conditions

The living radical polymerization method used in the step (i) may be performed at a temperature of usually −50 to 200° C., preferably 0 to 150° C., more preferably 20 to 130° C. The polymerization temperature range may be determined by appropriate combination of these lower and upper limits.

After completion of the polymerization, the obtained first block chain may be separated from the polymerization reaction solution, or the polymerization reaction solution may be directly supplied to the subsequent step (ii). In the case where the first block chain is separated from the polymerization reaction solution, distillation-off of residual monomers and/or solvents, precipitation in appropriate solvent, filtration or centrifugal separation of precipitated polymers, and washing and drying of resultant polymers may be carried out by known methods. Also, if required, the polymerization reaction solution may be further diluted in a good solvent for the produced polymer such as tetrahydrofuran (THF) and toluene, and then passed through a column filled with alumina, silica or clay, or through a pad to remove the transition metal complex used as the catalyst from the polymerization solvent. In addition, there may be adopted a method of dispersing a metal adsorbent in the polymerization reaction solution to remove residual metal components therefrom.

The first block chain "..A.." obtained in the step (i) is an acrylate-based monomer, and at least one propagated end of the block chain is a bromine end or an iodine end. When a monofunctional polymerization initiator is used in the step (i), the polymerization proceeds in one direction from the polymerization initiator, and the propagated end is constituted by a bromine end or an iodine end. Therefore, theoretically, one bromine end or one iodine end is contained per one molecule. When a difunctional polymerization initiator is used in the step (i), the polymerization proceeds in two directions from the polymerization initiator, and the propagated ends are constituted by a bromine end or an iodine end. Therefore, theoretically, two bromine or iodine ends are contained per one molecule. Since the first block chain obtained in the step (i) is an acrylate-based polymer, one bromine end or one iodine end is theoretically formed per one propagated end of the block chain. However, in some cases, the structure of the bromine or the iodine end may be varied because of occurrence of side reactions such as recombination reaction, disproportionation reaction and elimination of the bromine or iodine atom. The amount of the bromine end or the iodine end may be calculated, for example, from the integrated NMR value of adjacent protons measured using a proton nuclear magnetic resonance ($^1$H-NMR) spectrometer.

(ii) Step for Forming the Second Block Chain

After forming the first block chain "..A.." in the step (i), the obtained polymer may be isolated from the polymerization reaction solution, and used as a macroinitiator in the subsequent step (ii) to newly initiate the polymerization reaction for production of the second block chain. Alternatively, after forming the first block chain, the methacrylate-based monomer may be successively added to the polymerization reaction solution to immediately initiate the polymerization reaction for production of the second block chain.

(a2) Polymerization Solvent

The step (ii) is preferably carried out in the presence of a polymerization solvent. When the step (i) is conducted in the absence of a solvent or the polymer obtained in the step (i) is isolated from the solvent after forming the first block chain, a fresh solvent may be added to the polymer obtained in the step (i) to initiate the step (ii). Also, an additional amount of the solvent may be added to the polymerization reaction solution containing the polymer obtained in the step (i) and the solvent, if required. Examples of the polymerization solvents may include those exemplified in the above (a1), more specifically water, ethers, amides, nitriles and alcohols. Among these solvents, at least one solvent selected from the group consisting of water, ethers, amides, nitrites and alcohols is more preferred, and at least one solvent selected from the group consisting of water, ethers, amides and alcohols is preferred. Of these solvents, water, anisole and DMF are especially preferred.

In the step (ii), the above polymerization solvent may be used in combination with the other solvent. Examples of the other solvent may include aromatic hydrocarbons such as benzene and toluene; halogenated hydrocarbons such as chlorobenzene, methylene chloride, chloroform and chlorobenzene; or the like. In such a case, it is required that the polymerization solvent is used in an amount not less than the molar amount of the polymerization initiator.

The amount of the polymerization solvent used is not particularly restricted, and is usually 0.1 to 5,000 parts by weight, preferably 1 to 2,000 parts by weight, more preferably 10 to 1,000 parts by weight based on 100 parts by weight of the first block chain and the monomers charged. The range of amount of the polymerization solvent used may also be determined by appropriate combination of these lower and upper limits.

(b3) Polymerization Initiator

In the step (ii), the first block chain obtained in the step (i) is used as the polymerization initiator, i.e., macroinitiator.

As described above, the first block chain obtained in the step (i) is an acrylate-based polymer and contains at least one bromine or iodine end. The bromine or iodine end acts as a polymerization initiation point in the step (ii). Therefore, if one propagated end is contained in the first block chain, the polymerization proceeds in one direction in the step (ii), and if two propagated ends are contained in the first block chain, the polymerization proceeds in two directions in the step (ii).

(c3) Redox Catalyst

In the step (ii), there is used a redox catalyst comprising a metal complex containing at least one transition metal (M) as a central metal selected from the group consisting of elements of Groups 7 to 11 of the Periodic Table, and a ligand containing at least a halogen atom selected from the group consisting of chlorine and fluorine. The redox catalyst contains a low-valence metal $(M)^n$ wherein n is an integer, and a high-valence metal $(M)^{n+1}$ both constituting the redox catalyst system, and has a ratio of $(M)^n$ to $(M)^{n+1}$ of 90/10 to 0.1/99.9, preferably 60/40 to 1/99, upon initiation of the polymerization for forming the second block chain. The range of the molar ratio may be determined by appropriate combination of these lower and upper limits.

As the redox catalyst, the low-valence metal complexes or the high-valence metal complexes containing chlorine or fluorine as the halogen atom X among those compounds exemplified in the above (c1) may be used in this step (ii). Of these low-valence metal complexes, monovalent copper compounds are preferred, and copper chloride and copper fluoride are more preferred. When the halogen atom constituting these metal complexes used upon formation of the second block is not chlorine nor fluorine, the $K_{act}$ for (..A..)(B..) becomes too large, so that the efficiency of using the first block chain (..A..) as the polymerization initiator is lowered. More specifically, the propagation reaction of (..A..)(..B..) already initiated, proceeds preferentially, so that a part of the first block chain (..A..) remains unblocked. As a result, the obtained polymer has a bimodal molecular weight distribution, thereby failing to obtain a block copolymer having a narrow molecular weight distribution.

The redox catalyst used in the present step can be formed by adding the high-valence metal complex to the low-valence metal complex. In the process of the present invention, it is required that the molar ratio of the low-valence metal $(M)^n$ to the high-valence metal $(M)^{n+1}$ both constituting the redox catalyst system is in the range of 90/10 to 0.1/99.9. By conducting the step (ii) under this condition, the polymerization can be controlled without considerable deterioration in polymerization rate while maintaining the redox equilibrium. Thus, in the process of the present invention, since the polymerization proceeds in a living manner, it is possible to produce a polymer having a narrow molecular weight distribution. On the other hand, when the amount of the low-valence metal $(M)^n$ exceeds the above range, it is difficult to control the polymerization. When the amount of the low-valence metal $(M)^n$ is less than the above range, the polymerization cannot proceed at a sufficient rate. The halogen atoms contained in the low-valence and high-valence metal complexes of the redox catalyst used in the step (ii) is preferably identical to each other.

The amount of the metal complex used and the organic ligand thereof are the same as those described in the above (c1).

(d3) Methacrylate-Based Monomer

As the methacrylate-based monomer (B) used in the step (ii), there may be used those exemplified as the methacrylate-based monomers in the above first aspect of the present invention.

These monomers may be used in combination of two or more thereof, and may be random-copolymerized or block-copolymerized. Further, the monomer may be gradually added during the polymerization.

(e3) Other Polymerization Conditions

The polymerization method of the step (ii) may be performed at a temperature of usually −50 to 200° C., preferably 0 to 150° C., more preferably 20 to 130° C. The polymerization temperature range may be determined by appropriate combination of these lower and upper limits.

Following the above steps (i) and (ii), the polymerization for forming third and subsequent block chains may be successively performed.

The monomers usable for forming the third block chain are not particularly restricted as long as they are random-polymerizable monomers. As such monomers, there may be usually used styrene-based monomers, acrylate-based monomers and methacrylate-based monomers. Among these monomers, styrene-based monomers and acrylate-based monomers are preferred from the standpoint of facilitated polymerization, and styrene-based monomers are more preferred.

After completion of the polymerization, the obtained polymer may be subjected to distillation-off of residual monomers and/or solvents, precipitation in appropriate solvent, filtration or centrifugal separation of precipitated polymers, and washing and drying of resultant polymers by known methods.

Also, if required, the polymerization reaction solution may he diluted in a good solvent for the produced polymer such as THF and toluene, and then passed through a column filled with alumina, silica or clay, or through a pad to remove the transition metal complex used as the catalyst from the polymerization solvent. In addition, there may be adopted a method of dispersing a metal adsorbent in the polymerization reaction solution to remove residual metal components therefrom. If required, the metal components may remain in the obtained polymer. The obtained polymer may be then analyzed by size exclusion chromatography and NMR spectra measurement.

As solvent used for the precipitation, there may be used water; $C_5$ to $C_8$ alkanes such as pentane, hexane and heptane; $C_5$ to $C_8$ cycloalkanes such as cyclohexane; $C_1$ to $C_6$ alcohols such as methanol, ethanol and isopropyl alcohol; or the like. Among these solvents, water, hexane, methanol and mixtures thereof are preferred.

The block copolymer obtained by the process of the present invention contains the acrylate-based block chain and the methacrylate-based block chain. When the block copolymer is not subjected to a further step subsequent to the above steps (i) and (ii), the methacrylate-based block chain in the block copolymer contains at least one halogen end.

According to requirements, the block copolymer may be successively subjected to a further polymerization process in which the other monomers are polymerized therewith using the halogen end as polymerization initiation point to produce the other block copolymer containing a further block chain. Also, the block copolymer may be subjected to a modification step for reacting the halogen end with a functional group-containing compound, thereby obtaining a block copolymer containing the aimed additional functional group. When the block copolymer is subjected to such subsequent steps after the steps (i) and (ii), the end thereof undergoes structural change.

The methacrylate-based chain of the block copolymer obtained after the steps (1) and (ii) without any subsequent steps contains the halogen-terminate end, i.e., the chlorine or fluorine end. When the block copolymer is subjected to the subsequent step after the steps (i) and (ii), it is preferred that the methacrylate-based block chain of the block copolymer has the chlorine end since the chlorine atom has a good reactivity and its polymerization can proceed at a desired rate. Also, when a monofunctional polymerization initiator is used in the step (i), the obtained polymer is a di-block copolymer obtained by polymerizing the second block chain with one propagated end of the first block chain. Therefore, theoretically, the block copolymer contains one halogen end per one molecule. On the other hand, when a difunctional polymerization initiator is used in the step (i), the obtained polymer is a tri-block copolymer obtained by polymerizing the second block chain with both propagated ends of the first block chain. Therefore, theoretically, the block copolymer contains two halogen ends per one molecule.

However, in some cases, the structure of the halogen end may be varied because of occurrence of side reactions such as recombination reaction, disproportionation reaction and elimination of the halogen atom. The amount of the halogen end is 0.7 to 1, preferably 0.8 to 1 per one propagated end. The amount of the halogen end may be calculated, for example, from the integrated NMR value of adjacent protons measured using a proton nuclear magnetic resonance ($^1$H-NMR) spectrometer.

The polymer obtained by the process of the present invention has a number-average molecular weight (Mn) of usually 250 to 500,000, preferably 500 to 250,000. The range of the number-average molecular weight may be determined by appropriate combination of these lower and upper limits. The molecular weight distribution (weight-average molecular weight (Mw)/number-average molecular weight (Mn)) of the obtained polymer is usually not more than 1.8, preferably not more than 1.5.

The block copolymer of the present invention is produced by a living radical polymerization method and, therefore, has an end capable of initiating the polymerization. The polymerization can be freely controlled by using the end capable of initiating the polymerization, i.e., can be freely stopped and initiated again.

Next, the process for producing a block copolymer according to the third aspect of the present invention is explained below.

The process for producing a block copolymer according to the third aspect of the present invention, comprises:

first forming a first block chain by polymerizing (d4-1) an acrylate-based monomer in the presence of (b4) a redox catalyst comprising a metal complex containing at least one transition metal as a central metal selected from the group consisting of elements of Groups 7 to 11 of the Periodic Table, using a polymerization initiator selected from the group consisting of organohalogen compounds and halogenated sulfonyl compounds; and then forming a second block chain by polymerizing the first block chain with an acrylate-based monomer and/or a styrene-based monomer, and a methacrylate-based monomer.

The respective steps are explained in detail below.

(a4) Polymerization Solvent

In the process of the present invention, the radical polymerization may be carried out in the absence of a solvent or in the presence of various solvents. Examples of the optionally usable polymerization solvents may include the same solvents as used in the above (a2). The amount of the polymerization solvent used is not particularly restricted, and may be similar to that used in the above (a2).

(b4) Polymerization Initiator

As the polymerization initiator, there may be used those represented by the formulae (1) to (19) in the above (b1). Specific and preferred examples of such polymerization initiators may be similar to those described in the above (b1).

(c4) Redox Catalyst

As the redox catalyst, there may be used such a redox catalyst comprising a metal complex containing at least one transition metal (M) as a central metal selected from the group consisting of elements of Groups 7 to 11 of the Periodic Table, as defined in (c1). The central metal (M) is preferably at least one metal selected from the group consisting of Cu, Ru, Fe and Ni.

The redox catalyst used in the process of the present invention can be formed by adding the high-valence metal complex to the low-valence metal complex as described in the above (c1). Although the amounts of the low-valence metal $(M)^n$ and the high-valence metal $(M)^{n+1}$ both constituting the redox catalyst system are not particularly restricted, the molar ratio of the low-valence metal $(M)^n$ to the high-valence metal $(M)^{n+1}$ is usually 99.9/0.1 to 0.1/99.9, preferably 90/10 to 1/99, more preferably 90/10 to 10/90. The range of the molar ratio may be determined by appropriate combination of these lower and upper limits.

(d4) Polymerizable Monomer

Next, the polymerizable monomers used in the process of the present invention are explained. In the process of the present invention, the acrylate-based monomer is first polymerized to form the first block chain, and then the obtained first block chain is polymerized with the acrylate-based monomer and/or the styrene-based monomer, and the methacrylate-based monomer to form the second block chain.

Specific examples of the acrylate-based monomer used for forming the first block chain may include methyl acrylate, ethyl acrylate, propyl acrylate, n-butyl acrylate, t-butyl acrylate, hexyl acrylate, 2-ethylhexyl acrylate, nonyl acrylate, benzyl acrylate, cyclohexyl acrylate, lauryl acrylate, n-octyl acrylate, 2-methoxyethyl acrylate, butoxyethyl acrylate, methoxy tetraethylene glycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethylene glycol acrylate, polyethylene glycol acrylate, 2-(dimethylamino)ethyl acrylate, N,N-dimethyl acrylamide, N-methylol acrylamide or the like. These monomers may be used in combination of two or more thereof, and random-copolymerized or block-copolymerized. Further, these monomer may be gradually added during the polymerization.

Specific examples of the methacrylate-based monomer used for forming the second block chain may include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, cyclohexyl methacrylate, lauryl methacrylate, n-octyl methacrylate, 2-methoxyethyl methacrylate, butoxyethyl methacrylate, methoxy tetraethylene glycol methacrylate, 2-hydroxyethyl methacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethylene glycol methacrylate, polyethylene glycol methacrylate, 2-(dimethylamino)ethyl methacrylate or the like. These monomers may be used in combination of two or more thereof.

As the acrylate-based monomer used together with the above methacrylate-based monomer, there may be exemplified those acrylate-based monomers described above for forming the first block chain. As the styrene-based monomer used together with above methacrylate-based monomer, there may be exemplified styrene, o-methoxystyrene, m-methoxystyrene, p-methoxystyrene, o-t-butoxy styrene, m-t-butoxy styrene, p-t-butoxy styrene, o-chloromethyl styrene, m-chloromethyl styrene, p-chloromethyl styrene or the like.

The feature of the present invention resides in that the first block chain formed from the acrylate-based monomer is polymerized with the acrylate-based monomer and/or the styrene-based monomer, and the methacrylate-based monomer to form the second block chain. As a result, it is possible to produce a copolymer having a narrow molecular weight distribution. Specifically, when the first block chain formed from the acrylate-based monomer (A) is polymerized with the methacrylate-based monomer (B) solely, the $K_{act}$ for (..A..) (B.) becomes too large, so that the efficiency of using the first block chain (..A..) as the polymerization initiator is lowered. More specifically, the propagation reaction of (..B..) already initiated, proceeds preferentially, so that a part of the first block chain (..A..) remains unblocked. As a result, the obtained polymer has a bimodal molecular weight distribution, thereby failing to obtain a block copolymer having a narrow molecular weight distribution.

In the process of the present invention, the amounts of the acrylate-based monomer and/or the styrene-based monomer may be appropriately selected so as to control the above $K_{act}$ to an adequate range. The weight ratio of the acrylate-based monomer and/or the styrene-based monomer to the methacrylate-based monomer is usually 1 to 50% by weight, preferably 1 to 40% by weight, more preferably 1 to 30% by weight. The range of the weight ratio may be determined by appropriate combination of these lower and upper limits. When the amounts of the acrylate-based monomer and/or the styrene-based monomer used are less than the above-specified range, the effect of the present invention cannot be sufficiently exhibited. When the amounts of the acrylate-based monomer and/or the styrene-based monomer used are less than the above-specified range, the feature of the methacrylate-based monomer cannot be sufficiently exhibited.

Upon block polymerization, after forming and isolating the first block chain (polyacrylate), the polymerization reaction for forming the second block chain may be initiated using the first block chain as a macroinitiator. Alternatively, after forming the first block chain, the monomer for forming the second block chain may be successively added thereto. Also, the monomer may be added to the first block chain at one time or may be gradually dropped thereinto.

(e4) Other Polymerization Conditions

The living radical polymerization method used in the process of the present invention may be performed at a temperature of usually −50 to 200° C., preferably 0 to 150° C., more preferably 20 to 130° C. The polymerization temperature range may be determined by appropriate combination of these lower and upper limits.

After completion of the polymerization, the obtained block copolymer may be subjected to distillation-off of residual monomers and/or solvents, precipitation in appropriate solvent, filtration or centrifugal separation of precipitated polymers, and washing and drying of resultant polymers by known methods. These treatments may be performed under the same conditions as described in (e1).

The block copolymer obtained by the process of the present invention has a number-average molecular weight (Mn) of usually 250 to 500,000, preferably 500 to 250,000. The range of the number-average molecular weight may be determined by appropriate combination of these lower and upper limits. The molecular weight distribution (weight-average molecular weight (Mw)/number-average molecular weight (Mn)) of the obtained block copolymer is usually not more than 1.8, preferably not more than 1.5. Since the process of the present invention is performed by a living radical polymerization method, the polymerization can be freely controlled, i.e., can be freely stopped and initiated again.

Applications of Polymer Obtained by the Present Invention

The acrylate-based polymer obtained by the present invention has especially a narrow molecular weight distribution, and can be used in various applications because of various excellent properties thereof.

The polymer obtained by the present invention may be directly applied to elastomers, engineering resins, paints, adhesives, inks and image-forming compositions as well as additives such as cement modifiers, dispersants, emulsifiers, surfactants, viscosity coefficient modifiers, paper additives, anti-static agents, coating agents and resin modifiers. Also, the polymer obtained by the present invention may be used as an intermediate product of higher-molecular polymer products such as polyurethane, and specifically can be applied to water-treatment chemicals, composite parts, cosmetics, hair supplies, drugs such as intestinal dilators, diagnostic agents and sustained release compositions.

As described above, since the acrylate-based polymer obtained by the present invention can be used in various applications, an industrial value of the present invention is extremely high.

EXAMPLES

The present invention will be described in more detail by reference to the following examples. However, the following examples are only illustrative and not intended to limit the scope of the present invention thereto. In the following examples, the molecular weight was measured by a gel permeation chromatography (GPC) corrected by a polystyrene standard specimen. Also, the amount of residual terminal halogen per one propagated end was calculated from integrated values of adjacent protons measured using a proton nuclear magnetic resonance ($^1$H-NMR) spectrometer.

Example 1

50 ml (49.8 g) of anisole as a solvent, 52 g ($2.93 \times 10^{-1}$ mol) of benzyl methacrylate as a monomer, 0.3054 g ($1.76 \times 10^{-3}$ mol) of pentamethyldiethylenetriamine as a ligand and 0.5260 g ($2.91 \times 10^{-3}$ mol) of methyl 2-bromoisobutyrate as a polymerization initiator were charged into a flask, and stirred by nitrogen bubbling for 15 minutes, thereby obtaining a mixed solution. Then, the thus obtained mixed solution, and a catalyst composed of 0.0413 g ($2.88 \times 10^{-4}$ mol) of cuprous bromide and 0.3402 g ($1.52 \times 10^{-3}$ mol) of cupric bromide (I valence/II valence=16/84) were charged into a flask equipped with a nitrogen-purged condenser, a nitrogen feed pipe, a stirrer and a thermometer, and polymerized at 70° C., thereby obtaining a benzyl methacrylate polymer. At an optional time, the reaction solution was sampled from the flask to measure a molecular weight of the obtained polymer. As shown in Table 1, it was confirmed that the molecular weight of the polymer was increased with the passage of polymerization time, and the molecular weight distribution thereof (Mw/Mn) was as narrow as not more than 1.40. In Table 1, the dash "–" in the column "Yield (%)" means that no measurement was conducted.

TABLE 1

| Polymerization time (min.) | Number-average molecular weight | Molecular weight distribution | Yield (%) |
|---|---|---|---|
| 10 | 2,107 | 1.40 | — |
| 20 | 3,306 | 1.28 | — |
| 30 | 4,212 | 1.22 | — |
| 40 | 4,614 | 1.23 | — |
| 50 | 4,997 | 1.24 | — |
| 60 | 5,399 | 1.27 | — |
| 75 | 5,631 | 1.27 | — |
| 90 | 6,033 | 1.32 | — |
| 120 | 7,101 | 1.29 | 49 |

Example 2

A mixed solution was produced by the same method as defined in Example 1 except that 30 ml of water as a solvent, 10.15 g ($3.56 \times 10^{-2}$ Mol) of methoxy tetraethylene glycol methacrylate as a monomer, 0.2648 g ($1.66 \times 10^{-3}$ Mol) of 2,2'-bipyridyl as a ligand and 0.0668 g ($3.69 \times 10^{-4}$ Mol) of methyl 2-bromoisobutyrate as a polymerization initiator were used. Then, the polymerization of the thus obtained mixed solution containing the monomer was conducted by the same method as defined in Example 1 except that 0.0116 g ($1.17 \times 10^{-4}$ mol) of cuprous chloride and 0.0966 g ($7.18 \times 10^{-4}$ mol) of cupric chloride (I valence/II valence=14/86) were charged as a catalyst, and the polymerization temperature was changed to 20° C. As shown in Table 2, it was confirmed that the molecular weight of the obtained polymer was increased with the passage of polymerization time, and the molecular weight distribution thereof (Mw/Mn) was as narrow as not more than 1.40. In Table 2, the dash "–" in the column "Yield (%)" means that no measurement was conducted.

TABLE 2

| Polymerization time (min.) | Number-average molecular weight | Molecular weight distribution | Yield (%) |
|---|---|---|---|
| 27 | 4,526 | 1.25 | — |
| 80 | 7,833 | 1.31 | — |
| 220 | 10,637 | 1.31 | 53 |
| 285 | 11,600 | 1.33 | — |

Example 3

A mixed solution was produced by the same method as defined in Example 1 except that 70 ml of anisole as a solvent, 70 g (2.84 mol) of benzyl methacrylate as a monomer, 0.663 g ($3.83 \times 10^{-3}$ mol) of pentamethyldiethylenetriamine as a ligand and 0.0668 g ($3.69 \times 10^{-4}$ mol) of methyl 2-bromoisobutyrate as a polymerization initiator were used. Then, the polymerization of the thus obtained mixed solution containing the monomer was conducted by the same method as defined in Example 1 except that 0.5664 g ($3.95 \times 10^{-3}$ mol) of cuprous bromide (I valence/II valence=100/0) were charged as a catalyst, and the polymerization temperature was changed to 30° C. As shown in Table 3, it was confirmed that a polymer having a number-average molecular weight (Mn) of not less than 10,000 was produced within 10 minutes from initiation of the polymerization, and the molecular weight distribution of the obtained polymer (Mw/Mn) was as wide as not less than 1.5. This showed that the polymerization was uncontrollable. In Table 3, the dash "–" in the column "Yield (%)" means that no measurement was conducted.

TABLE 3

| Polymerization time (min.) | Number-average molecular weight | Molecular weight distribution | Yield (%) |
|---|---|---|---|
| 7 | 11,111 | 1.72 | — |
| 23 | 15,990 | 1.63 | — |
| 37 | 19,525 | 1.55 | 67 |

Example 4

The polymerization of the mixed solution containing the monomer was conducted by the same method as defined in Example 3 except that 0.0507 g ($2.17 \times 10^{-4}$ mol) of cupric bromide (I valence/II valence=95/5) was further added as a catalyst, and the polymerization temperature was changed to 20° C. At an optional time, the obtained reaction solution was sampled from the flask to measure a molecular weight of the obtained polymer. As shown in Table 4, it was confirmed that a polymer having a number-average molecular weight (Mn) of about 10,000 was produced within 10 minutes from initiation of the polymerization, and the molecular weight distribution of the obtained polymer (Mw/Mn) was as wide as not less than 1.8. This showed that the polymerization was uncontrollable.

TABLE 4

| Polymerization time (min.) | Number-average molecular weight | Molecular weight distribution | Yield (%) |
|---|---|---|---|
| 10 | 9,860 | 1.88 | 25 |

Example 5

A mixed solution was produced by the same method as defined in Example 1 except that 30 ml of water as a solvent, 10.23 g ($3.59 \times 10^{-2}$ mol) of methoxy tetraethyleneoxide methacrylate as a monomer, 0.178 g ($1.53 \times 10^{-3}$ mol) of 2,2'-bipyridyl as a ligand and 0.0615 g ($3.40 \times 10^{-4}$ mol) of methyl 2-bromoisobutyrate as a polymerization initiator were used. Then, the polymerization of the thus obtained mixed solution containing the monomer was conducted by the same method as defined in Example 1 except that 0.0353 g ($3.57 \times 10^{-4}$ mol) of cuprous chloride (I valence/II valence= 100/0) were charged as a catalyst, and the polymerization temperature was changed to 20° C. As shown in Table 5, it was confirmed that a polymer having a number-average molecular weight (Mn) of not less than 10,000 was produced within 10 minutes from initiation of the polymerization, and the molecular weight distribution of the obtained polymer (Mw/Mn) was as wide as not less than 2.9. This showed that the polymerization was uncontrollable.

TABLE 5

| Polymerization time (min.) | Number-average molecular weight | Molecular weight distribution | Yield (%) |
|---|---|---|---|
| 10 | 28,815 | 2.91 | 22 |

Example 6

The polymerization of the mixed solution containing the monomer was conducted by the same method as defined in Example 1 except that hexane was used as a solvent instead of anisole. At an optional time, the obtained reaction solution was sampled from the flask to measure a molecular weight of the obtained polymer. As shown in Table 6, it was confirmed that the polymerization was substantially stopped so that no high-molecular polymer was obtained, and the molecular weight distribution of the obtained polymer (Mw/Mn) was as wide as not less than 1.5. This showed that the polymerization was uncontrollable. In Table 6, the dash "–" in the column "Yield (%)" means that no measurement was conducted.

TABLE 6

| Polymerization time (min.) | Number-average molecular weight | Molecular weight distribution | Yield (%) |
|---|---|---|---|
| 15 | 1,280 | 1.51 | — |
| 60 | 3,155 | 1.45 | — |
| 120 | 3,020 | 1.87 | 5 |

Example 7

The same procedure as defined in Example 1 was conducted except that dimethylformamide (DMF) was used as a solvent instead of anisole, 0.0285 g ($2.88 \times 10^{-4}$ mol) of cuprous chloride and 0.0043 g ($3.20 \times 10^{-5}$ mol) of cupric chloride (I valence/II valence=90/10) were used as a catalyst, and 29 g of ($2.93 \times 10^{-1}$ mol) of methyl methacrylate and 30.5 g ($2.93 \times 10^{-1}$ mol) of styrene were used as a monomer instead of benzyl methacrylate. The results are shown in Table 7.

TABLE 7

| Polymerization time (min.) | Number-average molecular weight | Molecular weight distribution | Yield (%) |
|---|---|---|---|
| 300 | 18,000 | 1.27 | 75 |

Example 8

The same procedure as defined in Example 7 was conducted except that 0.0285 g ($2.88 \times 10^{-4}$ mol) of cuprous chloride and 0.0077 g ($5.76 \times 10^{-5}$ mol) of cupric chloride (I valence/II valence=83.3/16.7) were used as a catalyst, and 29 g of ($2.93 \times 10^{-1}$ mol) of methyl methacrylate solely was used as a monomer. The results are shown in Table 8.

TABLE 8

| Polymerization time (min.) | Number-average molecular weight | Molecular weight distribution | Yield (%) |
|---|---|---|---|
| 300 | 23,100 | 1.26 | 68 |

Production Example 1
(Production of Monofunctional Macroinitiator A):

540.34 g of anisole as a solvent, 393.19 g (3.07 mol) of t-butyl acrylate as a monomer, 5.3117 g ($3.07 \times 10^{-2}$ mol) of pentamethyldiethylenetriamine as a ligand and 2.5441 g ($1.52 \times 10^{-2}$ mol) of methyl 2-bromopropionate as a polymerization initiator were charged into a flask, and stirred by nitrogen bubbling for 15 minutes, thereby obtaining a mixed solution. Then, the thus obtained mixed solution and 2.2615 g ($1.58 \times 10^{-2}$ mol) of cuprous bromide as a catalyst were charged into a flask equipped with a nitrogen-purged condenser, a nitrogen feed pipe, a stirrer and a thermometer, and polymerized at 90° C. for 120 minutes. After completion of the polymerization, the obtained reaction solution was passed through a column filled with active alumina to remove the copper complex catalyst. The resultant polymerization solution was dropped into 2000 ml of methanol to precipitate a polymer. The obtained polymer was then dried, thereby obtaining a t-butyl acrylate polymer (macroinitiator A). The molecular weight of the thus obtained polymer was measured by a gel permeation chromatography corrected by a polystyrene standard specimen. As a result, it was confirmed that the number-average molecular weight (Mn) of the obtained polymer was 1844, and the molecular weight distribution (Mw/Mn) thereof was 1.09.

Example 9

49.53 g of anisole as a solvent, 47.25 g ($4.728 \times 10^{-1}$ mol) of methyl methacrylate as a monomer, 1.8469 g ($1.07 \times 10^{-2}$ mol) of pentamethyldiethylenetriamine as a ligand and 4.95 g of the macroinitiator A produced in Production Example 1 as a polymerization initiator were charged into a flask, and stirred by nitrogen bubbling for 15 minutes, thereby obtaining a mixed solution. Then, the thus obtained mixed solution and a catalyst composed of 0.2438 g ($2.46 \times 10^{-3}$ mol) of cuprous chloride and 0.3522 g ($2.62 \times 10^{-3}$ mol) of cupric chloride (I valance/II valance=48.4/51.6) were charged into a flask equipped with a nitrogen-purged condenser, a nitrogen feed pipe, a stirrer and a thermometer, and polymerized at 85° C. At an optional time, the reaction solution was sampled from the flask to measure a molecular weight of the obtained polymer. As shown in Table 9, it was confirmed that the number-average molecular weight of the polymer was increased with the passage of polymerization time, and the molecular weight distribution thereof (Mw/Mn) was as narrow as not more than 1.6. In Table 9, the dash "–" in the column "Second block chain polymer" means that no measurement was conducted.

TABLE 9

| Polymerization time (min.) | Number-average molecular weight | Molecular weight distribution | Second block chain polymer | |
|---|---|---|---|---|
| | | | Kind of halogen | Residual amount |
| 0 | 1,844 | 1.09 | — | — |
| 30 | 7,919 | 1.52 | — | — |
| 60 | 14,633 | 1.52 | — | — |
| 90 | 19,714 | 1.54 | Cl | 0.92 |

Example 10

0.3792 g ($2.64 \times 10^{-3}$ mol) of cuprous bromide and 0.6207 g ($2.66 \times 10^{-3}$ mol) of cupric bromide (I valance/II valance= 49.8/50.2) were charged into a flask equipped with a nitrogen-purged condenser, a nitrogen feed pipe, a stirrer and a thermometer. Then, 47.34 g of anisole as a solvent, 48.33 g ($4.833 \times 10^{-1}$ mol) of methyl methacrylate as a monomer, 0.9237 g ($5.33 \times 10^{-2}$ mol) of pentamethyldiethylenetriamine as a ligand and 5.28 g of the macroinitiator A as a polymerization initiator were stirred by nitrogen bubbling for 15 minutes, thereby obtaining a mixed solution. The thus obtained mixed solution was charged into the above flask and then polymerized at 85° C. At an optional time, the reaction solution was sampled from the flask to measure a molecular weight of the obtained polymer. As shown in Table 10, it was confirmed that although the number-average molecular weight (Mn) of the polymer was increased with the passage of polymerization time, the molecular weight distribution thereof (Mw/Mn) was as wide as not less than 2.0. In Table 10, the dash "–" in the column "Second block chain polymer" means that no measurement was conducted.

TABLE 10

| Polymerization time (min.) | Number-average molecular weight | Molecular weight distribution | Second block chain polymer | |
|---|---|---|---|---|
| | | | Kind of halogen | Residual amount |
| 0 | 5,023 | 1.15 | — | — |
| 60 | 15,932 | 2.07 | — | — |
| 150 | 26,393 | 2.28 | — | — |
| 300 | 40,290 | 3.22 | Br | 0.48 |

Example 11

0.3259 g ($3.29 \times 10^{-3}$ mol) of cuprous chloride was charged into a flask equipped with a nitrogen-purged condenser, a nitrogen feed pipe, a stirrer and a thermometer. Then, 21.74 g of anisole as a solvent, 21.68 g ($2.168 \times 10^{-1}$ mol) of methyl methacrylate as a monomer, 0.5658 g ($3.26 \times 10^{-3}$ mol) of pentamethyldiethylenetriamine as a ligand and 5.28 g of the macroinitiator A as a polymerization initiator were stirred by nitrogen bubbling for 15 minutes, thereby obtaining a mixed solution. The thus obtained mixed solution was charged into the above flask and then polymerized at 85° C. At an optional time, the reaction solution was sampled from the flask to measure a molecular weight of the obtained polymer. As shown in Table 11, it was confirmed that although the number-average molecular weight (Mn) of the polymer was increased at an initial stage (15 minutes) of the polymerization, the number-average molecular weight was subsequently increased only in a very slight amount even with the elapse of the polymerization time. In Table 11, the dash "–" in the column "Second block chain polymer" means that no measurement was conducted.

TABLE 11

| Polymerization time (min.) | Number-average molecular weight | Molecular weight distribution | Second block chain polymer | |
|---|---|---|---|---|
| | | | Kind of halogen | Residual amount |
| 0 | 5,023 | 1.15 | — | — |
| 15 | 10,871 | 1.55 | — | — |
| 30 | 10,966 | 1.72 | — | — |
| 70 | 11,057 | 1.78 | Cl | 0.58 |

Production Example 2

(Production of Difunctional macroinitiator B):

50 ml (49.8 g) of anisole as a solvent, 44.7 g ($3.49 \times 10^{-1}$ mol) of n-butyl acrylate as a monomer, 1.090 g ($6.28 \times 10^{-3}$ mol) of pentamethyldiethylenetriamine as a ligand and 1.09 g ($3.15 \times 10^{-3}$ mol) of dimethyl 2,6-dibromo-1,7-heptanoate as a polymerization initiator were charged into a flask, and stirred by nitrogen bubbling for 15 minutes, thereby obtaining a mixed solution. Then, the thus obtained mixed solution and 0.4509 g ($3.16 \times 10^{-3}$ mol) of cuprous bromide as a catalyst were charged into a flask equipped with a nitrogen-purged condenser, a nitrogen feed pipe, a stirrer and a thermometer, and polymerized at 95° C. for 90 minutes. After completion of the polymerization, the obtained reaction solution was passed through a column filled with 50 g of active alumina to remove the copper complex catalyst therefrom. The resultant polymerization solution was dropped into 800 ml of a mixed solvent containing water and methanol at a volume ratio of 1/5 to precipitate a polymer. The obtained polymer was then dried, thereby obtaining a n-butyl acrylate polymer (macroinitiator B). The molecular weight of the thus obtained polymer was measured by a gel permeation chromatography corrected by a polystyrene standard specimen. As a result, it was confirmed that the number-average molecular weight (Mn) of the obtained polymer was 8,810, and the molecular weight distribution (Mw/Mn) thereof was 1.14.

Example 12

20 ml (20 g) of anisole as a solvent, 18.7 g ($1.87 \times 10^{-1}$ mol) of methyl methacrylate as a monomer, 282.6 mg ($1.63 \times 10^{-3}$ mol) of pentamethyldiethylenetriamine as a ligand and 3.0 g of the macroinitiator B produced in Production Example 2 as a polymerization initiator were charged into a flask, and stirred by nitrogen bubbling for 15 minutes, thereby obtaining a mixed solution. Then, the thus obtained mixed solution and a catalyst composed of 67.3 mg ($1.02 \times 10^{-4}$ mol) of cuprous chloride and 91.4 mg ($6.81 \times 10^{-4}$ mol) of cupric chloride (I valance/II valance=13/87) were charged into a flask equipped with a nitrogen-purged condenser, a nitrogen feed pipe, a stirrer and a thermometer, and polymerized at 95° C. for 120 minutes. After completion of the polymerization, the obtained polymerization solution was diluted with 100 ml (88.9 g) of THF, and passed through a column filled with 30 g of active alumina to remove the copper complex catalyst therefrom. The resultant solution was dropped into 800 ml of a mixed solvent containing water and methanol at a volume ratio of 1/5 to precipitate a polymer. The obtained polymer was then dried, thereby obtaining a colorless and transparent tri-block copolymer (methyl methacrylate block chain/n-butyl acrylate block chain/methyl methacrylate block chain). The molecular weight of the thus obtained polymer was measured by the same method as in Production Example 2, and the amount of residual end group was measured from $^1$H-NMR. As a result, it was confirmed that the number-average molecular weight (Mn) of the obtained tri-block copolymer was 18,210; the molecular weight distribution (Mw/Mn) thereof was 1.21; the halogen contained in the end group was chlorine; and the amount of residual end group was 1.86 per one molecule (i.e., 0.93 per one propagated end).

Example 13

The same polymerization and analysis procedures as defined in Example 12 were conducted except that only 67.3 mg ($1.02 \times 10^{-4}$ mol) of cuprous chloride was used as a catalyst instead of 67.3 mg ($1.02 \times 10^{-4}$ mol) of cuprous chloride and 91.4 mg ($6.81 \times 10^{-4}$ mol) of cupric chloride. As a result, it was confirmed that the number-average molecular weight (Mn) of the obtained tri-block copolymer was 36,766; the molecular weight distribution (Mw/Mn) thereof was 1.69; the halogen contained in the end group was chlorine; and the amount of the residual end group was 1.23 per one molecule (i.e., 0.61 per one propagated end). This showed that the control of the molecular weight was difficult.

Evaluation of Results of Examples 1 to 13:

As shown in the above Examples, it was confirmed that when the methacrylate-based monomer was polymerized in the presence of the redox catalyst having a molar ratio of the low-valence metal $(M)^n$ to the high-valence metal $(M)^{n+1}$ of 90/10 to 0.1/99.9 upon initiation of the polymerization, it was possible to produce the methacrylate-based polymer having a narrow molecular weight distribution. Also, as shown in the above Examples, it was confirmed that when the step for forming the methacrylate-based block chain was initiated in the presence of the redox catalyst having a molar ratio of the low-valence metal $(M)^n$ to the high-valence metal $(M)^{n+1}$ of 90/10 to 0.1/99.9 subsequent to the step for forming the acrylate-based block chain, it was possible to produce the block copolymer having a narrow molecular weight distribution and containing the acrylate-based block chain and the methacrylate-based block chain.

Production Example 3
(Production of Macroinitiator C):

1.6438 g ($1.15 \times 10^{-2}$ mol) of cuprous bromide as a catalyst was charged into a flask equipped with a nitrogen-purged condenser, a nitrogen feed pipe, a stirrer and a thermometer. Then, 147 g of anisole as a solvent, 129.76 g ($7.04 \times 10^{-1}$ mol) of 2-ethylhexyl acrylate as a monomer, 2.4448 g ($1.41 \times 10^{-2}$ mol) of pentamethyldiethylenetriamine as a ligand and 2.3620 g ($1.41 \times 10^{-2}$ mol) of methyl 2-bromopropionate as a polymerization initiator were stirred by nitrogen bubbling for 15 minutes, thereby obtaining a mixed solution. The thus obtained mixed solution was charged into the above flask and then polymerized at 95° C. for 120 minutes. After completion of the polymerization, the obtained reaction solution was passed through a column filled with active alumina to remove the copper complex catalyst therefrom. The resultant polymerization solution was dropped into methanol to precipitate a polymer. The obtained polymer was then dried, thereby obtaining a 2-ethylhexyl acrylate polymer (macroinitiator C). As a result of measurements, it was confirmed that the number-average molecular weight (Mn) of the obtained 2-ethylhexyl acrylate polymer (macroinitiator C) was 5,023, and the molecular weight distribution (Mw/Mn) thereof was 1.15.

Production Example 4
(Production of Macroinitiator D):

2.7469 g ($1.91 \times 10^{-2}$ mol) of cuprous bromide as a catalyst was charged into a flask equipped with a nitrogen-purged condenser, a nitrogen feed pipe, a stirrer and a thermometer. Then, 247.9 g of anisole as a solvent, 216.45 g (1.17 mol) of 2-ethylhexyl acrylate as a monomer, 4.0689 g ($2.35 \times 10^{-2}$ mol) of pentamethyldiethylenetriamine as a ligand, and 3.9264 g ($2.35 \times 10^{-2}$ mol) of methyl 2-bromopropionate as a polymerization initiator, were stirred by nitrogen bubbling for 15 minutes, thereby obtaining a mixed solution. The thus obtained mixed solution was charged into the above flask and then polymerized at 95° C. for 180 minutes. After completion of the polymerization, the obtained reaction solution was passed through a column filled with active alumina to remove the copper complex catalyst therefrom. The resultant polymerization solution was dropped into methanol to precipitate a polymer. The obtained polymer was then dried, thereby obtaining a 2-ethylhexyl acrylate polymer (macroinitiator D). As a result of measurements, it was confirmed that the number-average molecular weight (Mn) of the obtained 2-ethylhexyl acrylate polymer (macroinitiator D) was 5,368, and the molecular weight distribution (Mw/Mn) thereof was 1.15.

Example 14

0.1300 g ($9.06 \times 10^{-4}$ mol) of cuprous bromide and 0.0714 g ($3.06 \times 10^{-4}$ mol) of cupric bromide (I valance/II valance= 74.8/25.2) as catalysts were charged into a flask equipped with a nitrogen-purged condenser, a nitrogen feed pipe, a stirrer and a thermometer. Then, 49.54 g of anisole as a solvent, 37.18 g ($3.718 \times 10^{-1}$ mol) of methyl methacrylate and 8.76 g ($8.42 \times 10^{-2}$ mol) of styrene as monomers, 0.4153 g ($2.40 \times 10^{-3}$ mol) of pentamethyldiethylenetriamine as a ligand, and 2.55 g of the macroinitiator C produced in Production Example 3 as a polymerization initiator, were stirred by nitrogen bubbling for 15 minutes, thereby obtaining a mixed solution. The thus obtained mixed solution was charged into the above flask and then polymerized at 85° C. At an optional time, the reaction solution was sampled from the flask to measure a molecular weight of the obtained polymer. As shown in Table 12, it was confirmed that the number-average molecular weight (Mn) of the polymer was increased with the passage of polymerization time, and the molecular weight distribution thereof (Mw/Mn) was as narrow as not more than 1.5. In Table 12, the dash "–" in the column "Yield (%)" means that no measurement was conducted.

TABLE 12

| Polymerization time (min.) | Number-average molecular weight | Molecular weight distribution | Yield (%) |
| --- | --- | --- | --- |
| 0 | 5,023 | 1.15 | — |
| 90 | 8,021 | 1.28 | — |
| 290 | 13,623 | 1.45 | — |

Example 15

0.2112 g ($1.47 \times 10^{-3}$ mol) of cuprous bromide and 0.1729 g ($7.41 \times 10^{-4}$ mol) of cupric bromide (I valance/II valance=

16.6/83.4) as catalysts were charged into a flask equipped with a nitrogen-purged condenser, a nitrogen feed pipe, a stirrer and a thermometer. Then, 48.92 g of anisole as a solvent, 38.10 g ($3.81\times10^{-1}$ mol) of methyl methacrylate and 8.60 g ($6.71\times10^{-2}$ mol) of n-butyl acrylate as monomers, 0.7718 g ($4.45\times10^{-3}$ mol) of pentamethyldiethylenetriamine as a ligand, and 4.70 g of the macroinitiator D produced in Production Example 4 as a polymerization initiator, were stirred by nitrogen bubbling for 15 minutes, thereby obtaining a mixed solution. The thus obtained mixed solution was charged into the above flask and then polymerized at 80° C. At an optional time, the reaction solution was sampled from the flask to measure a molecular weight of the obtained polymer. As shown in Table 13, it was confirmed that the number-average molecular weight (Mn) of the polymer was increased with the passage of polymerization time, and the molecular weight distribution thereof (Mw/Mn) was as narrow as not more than 1.5. In Table 13, the dash "–" in the column "Yield (%)" means that no measurement was conducted.

TABLE 13

| Polymerization time (min.) | Number-average molecular weight | Molecular weight distribution | Yield (%) |
|---|---|---|---|
| 0 | 5,368 | 1.15 | — |
| 60 | 14,096 | 1.59 | — |
| 175 | 29,485 | 1.48 | — |

Example 16

0.2172 g ($1.53\times10^{-3}$ mol) of cuprous bromide and 0.0719 g ($3.08\times10^{-4}$ mol) of cupric bromide (I valance/II valance=33.2/66.8) as catalysts were charged into a flask equipped with a nitrogen-purged condenser, a nitrogen feed pipe, a stirrer and a thermometer. Then, 49.27 g of anisole as a solvent, 45.86 g ($4.596\times10^{-1}$ mol) of methyl methacrylate as a monomer, 0.6344 g ($3.66\times10^{-3}$ mol) of pentamethyldiethylenetriamine as a ligand, and 5.10 g of the macroinitiator D produced in Production Example 3 as a polymerization initiator, were stirred by nitrogen bubbling for 15 minutes, thereby obtaining a mixed solution. The thus obtained mixed solution was charged into the above flask and then polymerized at 85° C. At an optional time, the reaction solution was sampled from the flask to measure a molecular weight of the obtained polymer. As shown in Table 14, it was confirmed that although the number-average molecular weight (Mn) of the polymer was increased with the passage of polymerization time, the molecular weight distribution thereof (Mw/Mn) was as wide as not less than 2.0. In Table 14, the dash "–" in the column "Yield (%)" means that no measurement was conducted.

TABLE 14

| Polymerization time (min.) | Number-average molecular weight | Molecular weight distribution | Yield (%) |
|---|---|---|---|
| 0 | 5,023 | 1.15 | — |
| 30 | 19,737 | 2.65 | — |
| 110 | 39,466 | 3.43 | — |
| 390 | 40,290 | 4.22 | — |

Although the present invention has been described in detail above with reference to the specific examples, it is to be understood that modifications and variations can be made without departing from the sprits and scope of the present invention, as will be apparently understood by those skilled in the art.

The present application is based on Japanese Patent Application No. 2000-391307 filed on Dec. 22, 2000, Japanese Patent Application No. 2001-015231 filed on Jan. 24, 2001, and Japanese Patent Application No. 2001-015232 filed on Jan. 24, 2001 which are incorporated herein by reference.

What is claimed is:

1. A process for producing a block copolymer, comprising at least the following step (i) and step (ii):
   (i) forming a first block chain, said step (i) comprising polymerizing (d2) an acrylate-based monomer in the presence of (c2) a redox catalyst comprising a metal complex containing at least one transition metal (M) as a central metal selected from the group consisting of elements of Groups 7 to 11 of the Periodic Table, and a ligand containing at least a halogen atom selected from the group consisting of bromine and iodine, using (b2) a polymerization initiator selected from the group consisting of bromine- or iodine-containing organic halides and bromine- or iodine-containing halogenated sulfonyl compounds; and
   (ii) forming a second block chain, said step (ii) comprising polymerizing (d3) a methacrylate-based monomer in the presence of (c3) a redox catalyst comprising a metal complex containing at least one transition metal as a central metal selected from the group consisting of elements of Groups 7 to 11 of the Periodic Table and a ligand containing at least a halogen atom selected from the group consisting of chlorine and fluorine, said redox catalyst containing a low-valence metal $(M)^n$ wherein n represents an atomic valence of the metal, and a high-valence metal $(M)^{n+1}$ both constituting the redox catalyst system, and having a molar ratio of $(M)^n$ to $(M)^{n+1}$ of 90/10 to 0.1/99.9, upon initiation of the polymerization for forming the second block chain.

2. A process according to claim 1, wherein the low-valence metal $(M)^n$ is at least one metal selected from the group consisting of $Cu^{1+}$, $Ru^{2+}$, $Fe^{2+}$ and $Ni^{2+}$.

3. A block copolymer produced by the process as defined in claim 1.

4. A block copolymer comprising an acrylate-based block chain and a methacrylate-based block chain, at least one propagated end of the methacrylate-based block chain being a halogen end.

5. A block copolymer according to claim 4, wherein an amount of the halogen end is 0.7 to 1 per one propagated end.

6. A block copolymer according to claim 4, wherein the halogen end is a chlorine end or a fluorine end.

7. A block copolymer comprising an acrylate-based block chain and a methacrylate-based block chain which is produced by a process comprising the following step (i) and step (ii):
   (i) forming a first block chain, said step (i) comprising polymerizing (d2) an acrylate-based monomer in the presence of (c2) a redox catalyst comprising a metal complex containing at least one transition metal (M) as a central metal selected from the group consisting of elements of Grounds 7 to 11 of the Periodic Table, and a ligand containing at least a halogen atom selected from the group consisting of bromine and iodine, using (b2) a polymerization initiator selected from the group consisting of bromine- or iodine-containing organic halides and bromine- or iodine-containing halogenated sulfonyl compounds; and (ii) forming a second block chain, said step (ii) comprising polymerizing (d3) a methacrylate-based monomer in the presence of (c3) a redox catalyst comprising a metal complex containing at least one transition metal as a central metal selected from the group consisting of elements of Groups 7 to 11 of the Periodic Table, and a ligand containing at least a halogen atom selected from the group consisting of chlorine *nd fluorine, said redox catalyst containing a low-valence metal $(M)^n$ wherein n represents an atomic valence of the metal, and a high-valence metal $(M)^{n+1}$ both constituting the redox catalyst system, and having a molar ratio of $(M)^n$ to $(M)^{n+1}$ of 90/10 to 0.1/99.9, upon initiation of the polymerization for farming the second block chain.

8. A process for producing a block copolymer, comprising:

first forming a first block chain by polymerizing (d4-1) an acrylate-based monomer in the presence of (c4) a redox catalyst comprising a metal complex containing at least one transition metal (M) as a central metal selected from the group consisting of elements of Groups 7 to 11 of the Periodic Table, using (b4) a polymerization initiator selected from the group consisting of organohalogen compounds and halogenated sulfonyl compounds; and then forming a second block chain by polymerizing the first block chain with an acrylate-based monomer and/or a styrene-based monomer, and a methacrylates-based monomer.

9. A process according to claim 8, wherein the central metal (M) is at least one metal selected from the group consisting of Cu, Ru, Fe and Ni.

10. A process according to claim 8, wherein a ratio of the acrylate-based monomer, the styrene-based monomer to the methacrylate-based monomer or mixture thereof is 1 to 50% by weight.

* * * * *